United States Patent [19]
McIntyre et al.

[11] 4,089,140
[45] May 16, 1978

[54] CARPET INSTALLATION FOR FRANGIBLE AIRCRAFT FLOORS

[75] Inventors: Robert G. McIntyre, Manhattan Beach; Otto J. Minnich, Orange, both of Calif.

[73] Assignee: McDonnell Douglas Corporation, Long Beach, Calif.

[21] Appl. No.: 726,136

[22] Filed: Sep. 24, 1976

[51] Int. Cl.² .................... B64C 1/10; B64C 1/00
[52] U.S. Cl. .................................. 52/98; 49/141; 244/117 R; 244/118 P; 244/121; 244/129.1; 52/1; 52/390
[58] Field of Search ............... 244/118 P, 118 R, 121, 244/122 AF, 119, 129 R, 117 A; 137/68 R, 68 A; 182/19, 18; 52/98–100, 1, 232, 384, 385, 390

[56] References Cited
U.S. PATENT DOCUMENTS

| 1,930,024 | 10/1933 | Varden | 52/98 |
|---|---|---|---|
| 1,951,897 | 3/1934 | Binckley | 137/69 R |
| 2,679,467 | 5/1954 | Sherts | 244/121 |
| 2,942,811 | 6/1960 | Bell | 244/118 P |
| 3,288,992 | 11/1966 | Matsadaira | 137/68 R |
| 3,363,376 | 1/1968 | Wendel | 52/98 |
| 3,386,215 | 6/1968 | Wendel | 52/1 |
| 3,392,489 | 7/1968 | Johnson | 52/1 |
| 3,425,333 | 2/1969 | Wachter | 98/1.5 |
| 3,643,899 | 2/1969 | Firestone | 244/121 |
| 3,729,154 | 4/1973 | Peplante | 244/122 AF |
| 3,742,968 | 7/1973 | Kennedy | 137/68 |
| 3,834,076 | 9/1974 | Vallee | 49/31 |
| 3,938,764 | 12/1976 | McIntyre | 244/117 R |

FOREIGN PATENT DOCUMENTS

| 255,352 | 9/1962 | Australia | 52/384 |
|---|---|---|---|
| 867,561 | 4/1971 | Canada | 52/390 |
| 1,003,851 | 3/1957 | Germany | 137/68 R |
| 428,647 | 5/1935 | United Kingdom | 49/141 |

*Primary Examiner*—Price C. Faw, Jr.
*Assistant Examiner*—Henry Raduazo
*Attorney, Agent, or Firm*—John P. Scholl; Walter J. Jason; Donald L. Royer

[57] ABSTRACT

A carpet installation for use with a frangible panel to assist in the disintegration and breakup of the panel permitting ventilation through an aircraft floor. The carpet installation utilizes positioning and hold-down tiles to reduce adhesive contact with the frangible panel and isolators to limit the support for the panel and increase the shear forces on the panel during breakup of the panel.

6 Claims, 3 Drawing Figures

U.S. Patent    May 16, 1978    4,089,140
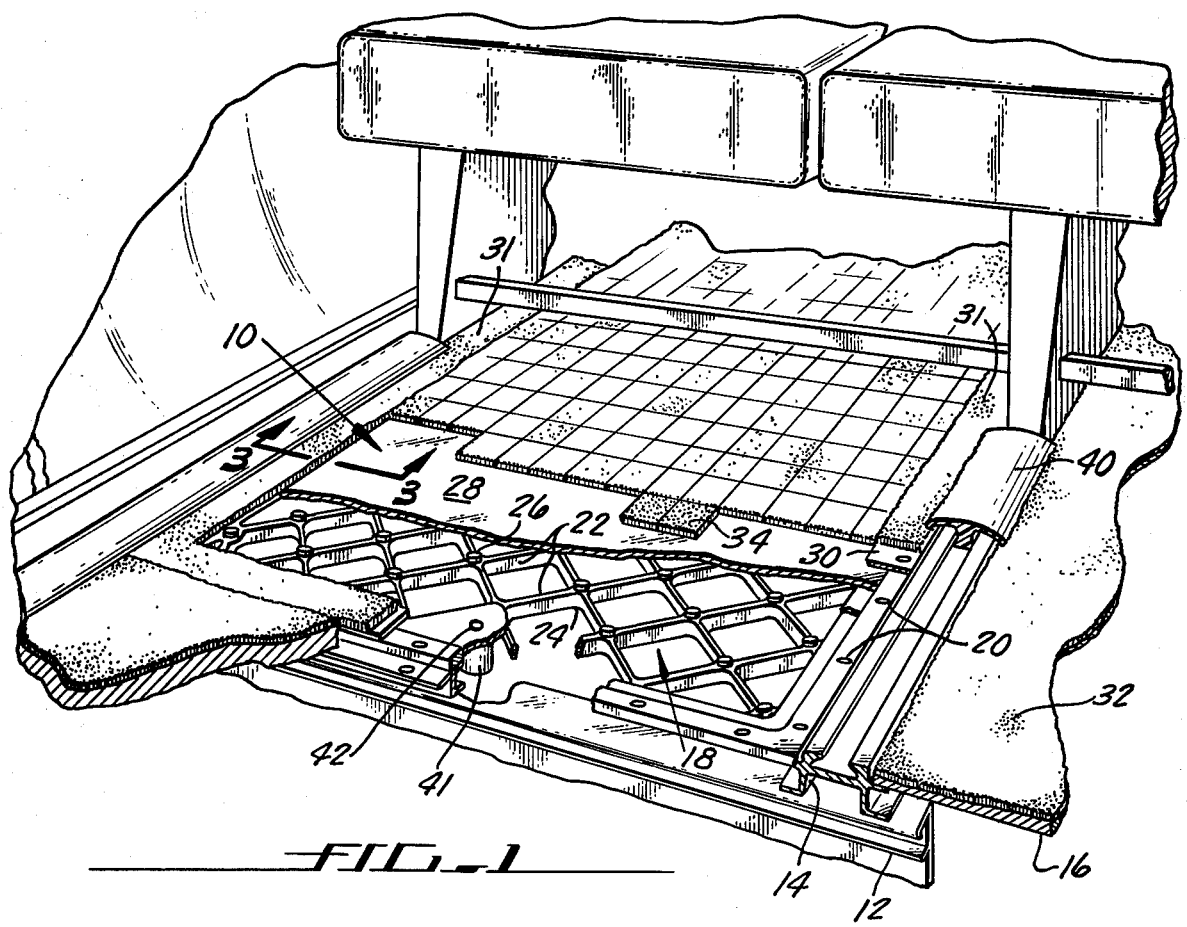
FIG_1
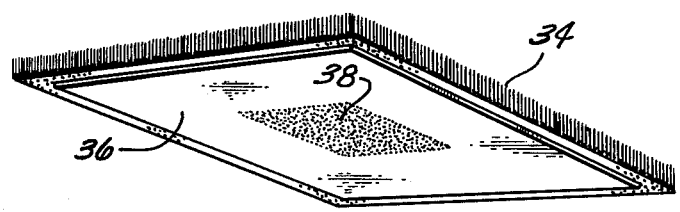
FIG_2
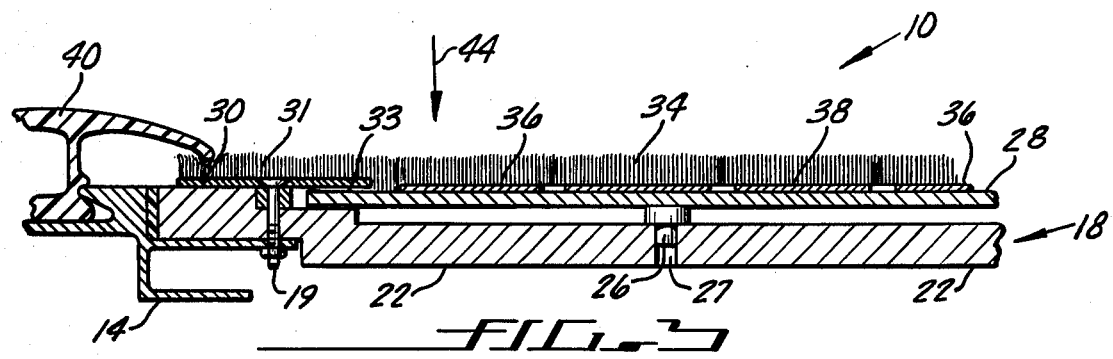
FIG_3

CARPET INSTALLATION FOR FRANGIBLE AIRCRAFT FLOORS

BACKGROUND OF THE PRESENT INVENTION

When large, wide-bodied aircraft, which are normally operated in a pressurized conditon at altitude, are subjected to decompression as a result of collision, explosion or other injury to the aircraft skin, severe damage to the aircraft structure can occur due to differential pressures in various compartments and the resulting forces on compartment structures. It has been found desirable to have substantially instantaneous venting of large compartments to equalize pressures and prevent undue strain on the aircraft structure.

U.S. Pat. No. 3,938,764 describes a frangible aircraft floor installation to provide venting of the aircraft floor when undesired differential pressures exist. The venting is accomplished in accordance with the teachings of the patent by providing the floor with a limited number of frangible panel installations. These panel installations are constructed with an underlying structural grid. This grid supports a frangible ceramic panel. The panel is overlayed with a carpet or other floor covering. When an undesirable differential pressure occurs across the floor structure of the aircraft, an initiator or disintegrator is activated and it strikes the frangible ceramic panel. The panel disintegrates into rice-grain size crystals and is broken up as a result of the flow of the air through the panel installation.

In U.S. Pat. No 3,938,764, the carpet used to cover the frangible floor panel is constructed of porous material to permit the airflow through the carpet. In an alternative embodiment, the carpet was cut along the lines of the underlying grid support structure to permit the carpet to pass through the support structure upon breakup of the frangible panel.

It is desirable to have uniform floor covering throughout the aircraft and, in the past, carpets have been provided for the frangible floor panel installation which matched the carpets in the remaining areas of the aircraft.

When the carpets were but to conform to the underlying grid structure, the small pieces of carpet tended to curl at the corners and edges and were easily displaced when subjected to use. Affixing the carpet directly to the frangible floor panel by adhesive bonding tended to inhibit the disintegration and breakup of the frangible panel.

The object of the present invention is to provide an improved carpet-covered frangible floor panel installation.

SUMMARY OF THE PRESENT INVENTION

In accordance with the present invention, the carpet covering for the frangible panel is cut into small pieces which are adhesively bonded to positioning and hold-down tiles. These tiles are in turn fixed to the frangible panel with a substantially smaller amount of adhesive. The reduction in the amount of adhesive used to position and hold down the tile on the panel increases the disintegration and breakup of the frangible panel.

To further assist in the breakup of the frangible panel, the panel is held in a standoff position from the underlying grid support by isolators. The isolators increase the shear force at certain points on the frangible panel and push out the individual particles of the ceramic sheet from their nesting position with adjacent particles.

BRIEF DESCRIPTION OF THE DRAWINGS

FIG. 1 is a fragmentary perspective view of a carpet-covered frangible panel installation in an air-craft floor;

FIG. 2 is a perspective view of a piece of carpet bonded to a positioning and hold-down tile; and FIG. 3 is a sectional view through the carpet-covered frangible floor installation of FIG. 1 along the section lines 3—3.

DETAILED DESCRIPTION OF PREFERRED EMBODIMENT

FIG. 1 depicts a frangible panel installation 10 in a portion of the aircraft floor. This frangible panel installation 10 divides the upper passenger compartment from the lower cargo compartment. The purpose of the frangible panel installation 10 is to permit instantaneous venting and equalization of pressures between the passenger and cargo compartments.

The aircraft flooring includes transverse beams 12 which support seat tracks 14 which are orientated longitudinally in the aircraft. The seat tracks 14 support flooring panels 16 and a grid structure 18. The grid structure 18 is held in position on the seating tracks 14 by bolts 19 (FIG. 3) which pass through holes 20 (FIG. 1). The grid structure 18 (FIG. 1) is composed of webs 22 which intersect at 90°. The grid structure is shown wherein the grid is constructed with openings of a predetermined size in form of squares. In a preferred embodiment the openings are 3.34 inches on a side.

Isolators 26 are placed at the intersection 24 of the webs 22. The isolators 26 may be approximately one-fourth inch in height. They may be constructed as part of the grid structure or may be a separate piece which is affixed by adhesive or inserted in holes 27 (FIG. 3) at the intersection 24 of the webs 22.

The frangible panel 28 is placed on top of the isolators 26. It is held in a standoff position from the grid by the isolators 26. The area of contact between the isolator 26 and the frangible panel 28 is less than the area of contact between the panel 28 and the grid structure 18 when the isolators 26 are not used. The use of isolators 26 assists in the breakup of the panel 28 because they reduce the support area for the frangible panel and consequently, upon fracture of the panel, the isolators induce greater shear forces on the panel to cause the individual grains to break out of their nesting position as the airflow through the frangible panel installation 10 forces the panel toward the cargo compartment.

A cover strip 30 is held in position on the grid structure 18 by bolts 19 as shown in FIG. 3. Overlying the cover strip 30 is a strip of carpet 31. When frangible panel 28 is fractured, it expands slightly in size and it is desirable that it be permitted to move under cover strip 30. In FIG. 3 a small gap 33 is shown indicating that frangible panel 28 is not restricted in movement by cover strip 30.

When the carpet covering of the prior art was cut into small pieces to pass through the grid structure, it would not stay in position and the carpet would tend to curl on the edges unless it was adhesively bonded to a flat immovable surface over substantially its entire underside. When the carpet pieces were adhesively bonded to the panel over its entire surface, the adhesive bonded carpet inhibited the fracturing and breakup of the panel because of the attachment of the fractured grain to the carpet pieces.

The present invention is designed to solve the problem of using the normal aircraft carpeting 32 (FIG. 1) in the frangible floor installation 10. The carpet is cut into small squares 34 (FIG. 2) approximately 1.5 inch on a side. These carpet squares are affixed in place by adhesively bonding them to positioning and hold-down tiles 36. These tiles may be 1.30 inch on a side, leaving a small border around the tile as seen in FIG. 2. A small amount of adhesive 38 which may be in the shape of a square one-half inch on a side is placed on the bottom of the positioning and hold-down tile 36. The adhesive 38 affixes the tile in position on the frangible panel 28 (FIG. 1). The tile, as aforementioned, holds the carpet flat and in position on the frangible panel.

The cross-sectional view, FIG. 3, shows the relative position of the various components of the frangible floor installation 10. Seat tracks 14 support the grid structure 18. At the intersection 24 of webs 22, isolators 26 have been positioned in holes 27. These isolators 26 support the center portion of frangible panel 28. Positioning and hold-down tiles 36 are affixed to the ceramic frangible panel 28 by adhesive 38. The carpet squares 34 are in turn adhesively bonded to the positioning and hold-down tiles 36. Since the area of adhesive contact between the tile and the panel is substantially less than the total surface area of the tile (approximately 1/9), the smaller amount of adhesive has less effect on the breakup of the panel.

Trim strip 40 (FIGS. 1 and 3) cover the groove in the top of seat track 14 and finishes the floor installation by covering the carpeting strips 31 and the main aircraft carpet 32.

Affixed to the grid structure 18 by bolts, not shown, is an aneroid actuator 41. This actuator 41 drives a hardened carbide-tipped point through hole 42 into the underside of the frangible panel 28 when there is an undesirable pressure differential across the aircraft floor. A complete description of the aneroid actuator is found in U.S. Pat. No. 3,938,764.

In operation, an undesirable differential pressure occurs across the aircraft floor and the aneroid actuator is set in motion. The frangible panel 28 is struck by the carbide point of the actuator and is fractured into small rice-grain size pieces. When the flow of air through the frangible floor installation is from the top as indicated by arrow 44 (FIG. 3), isolators punch out the small grain size pieces of the ceramic panel from their nesting position with adjacent particles. The carpet squares 34, positioning and hold-down tiles and grain size pieces of the frangible panel 28 then pass down into the cargo compartment.

While certain exemplary embodiments of this invention have been described and shown in the accompanying drawings, it is to be understood that such embodiments are merely illustrative of, and not restrictive on, the broad invention and that we do not desire to be limited in our invention to the specific constructions or arrangements shown and described, since various other obvious modifications may occur to persons having ordinary skill in the art.

What is claimed is:

1. A carpet-covered frangible floor installation comprising:
    underlying grid means defining openings of a predetermined size;
    frangible panel supported by said grid means;
    positioning and hold-down tiles which are smaller than the openings of a predetermined size in said grid means, said tiles affixed to said panel, the area of attachment between each of said tiles and said panel covering substantially less than the total area of said tile; and
    carpet pieces positioned on each of said positioning and hold-down tiles and affixed to said tiles, said carpet pieces being sized to pass with ease through said grid openings with said positioning and hold-down tiles.

2. The carpet-covered frangible floor installation of claim 1 wherein the carpet pieces are squares and the positioning and hold-down tiles are squares with slightly smaller surface area.

3. The carpet-covered frangible floor installation of claim 2 wherein the grid means has a square pattern of webs defining openings of a predetermined size and length, the sides of webs of the grid means are approximately twice the length of the sides of the carpet squares.

4. The carpet-covered frangible floor installation of claim 3 wherein said positioning and hold-down tiles are adhesively bonded to said panel and said carpet squares are adhesively bonded to said positioning and hold-down tiles.

5. The carpet-covered frangible floor installation of claim 1 wherein the grid means embodies isolators which hold the frangible panel in a standoff position from said grid means, said isolators contact a smaller area of said panel than said grid means.

6. A carpet-covered frangible floor installation comprising:
    an underlying grid structure for support defining openings of a predetermined size;
    isolators mounted on the top of said grid structure;
    frangible panel supported on top of said isolator and held in a standoff position from said grid structure by said isolators, said isolators reduce the area of contact between the frangible panel and the grid structure;
    square positioning and hold-down tiles affixed to the top of said frangible panel, the area of attachment between each of said tiles and said panel being substantially less than the total surface area of each of said tiles;
    square carpet pieces positioned on each of said positioning and hold-down tiles and affixed to said pieces, said carpet pieces being sized to pass through the openings of said grid structure with said positioning and hold-down tiles.

* * * * *